United States Patent
Hoshi et al.

(10) Patent No.: US 7,197,231 B2
(45) Date of Patent: Mar. 27, 2007

(54) RECORDING APPARATUS AND METHOD WITH SELECTION OF FIRST TUNER OR SECOND TUNER FOR RECEIVING IMAGE DATA OF DESIGNATED CHANNEL

(75) Inventors: Nobuhiro Hoshi, Yokohama (JP); Nobuharu Ichihashi, Kawasaki (JP); Tomoyuki Ohno, Ebina (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/382,129

(22) Filed: May 8, 2006

(65) Prior Publication Data

US 2006/0193604 A1 Aug. 31, 2006

Related U.S. Application Data

(62) Division of application No. 09/537,872, filed on Mar. 29, 2000, now abandoned.

(30) Foreign Application Priority Data

Apr. 2, 1999 (JP) .................................. 11-096116

(51) Int. Cl.
*H04N 5/91* (2006.01)
(52) U.S. Cl. ........................................................ 386/83
(58) Field of Classification Search .................... None
See application file for complete search history.

(56) References Cited

U.S. PATENT DOCUMENTS

| | | | |
|---|---|---|---|
| 4,489,351 A | 12/1984 | d'Alayer de Costemore d'Arc | ................................................................ 358/213 |
| 4,706,121 A | 11/1987 | Young | ........................ 358/142 |
| 4,977,455 A | 12/1990 | Young | ........................ 358/142 |
| 4,977,455 A | 4/1993 | Young | ........................ 358/142 |
| 5,353,063 A | 10/1994 | Yagisawa et al. | ........... 348/426 |
| 5,612,789 A | 3/1997 | Nagura | ......................... 365/65 |
| 5,619,337 A | 4/1997 | Naimpally | ................... 386/83 |
| 5,727,060 A * | 3/1998 | Young | ........................ 348/734 |
| 6,366,731 B1 | 4/2002 | Na et al. | ...................... 386/83 |
| 6,523,176 B1 | 2/2003 | Yamane et al. | ............... 725/58 |
| 6,577,808 B1 | 6/2003 | Oestreicher et al. | ......... 386/68 |
| 6,675,385 B1 * | 1/2004 | Wang | .......................... 725/39 |
| 6,760,537 B2 | 7/2004 | Mankovitz | ................... 386/83 |
| 2002/0133820 A1 | 9/2002 | Arai et al. | ..................... 725/39 |

\* cited by examiner

*Primary Examiner*—Thai Q. Tran
*Assistant Examiner*—Heather R. Jones
(74) *Attorney, Agent, or Firm*—Fitzpatrick, Cella, Harper & Scinto

(57) ABSTRACT

A recording apparatus includes an input device for inputting a television signal and channel information relating to the television signal from an external receiving apparatus which receives the television signal and generates the channel information, a recording device for recording the television signal, and a controller for controlling the recording device based on the channel information input by the input device.

8 Claims, 5 Drawing Sheets

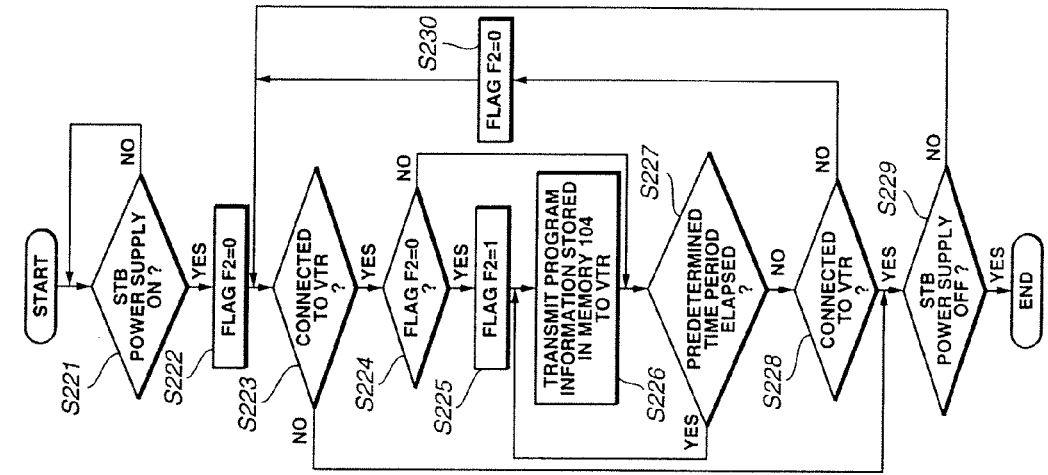
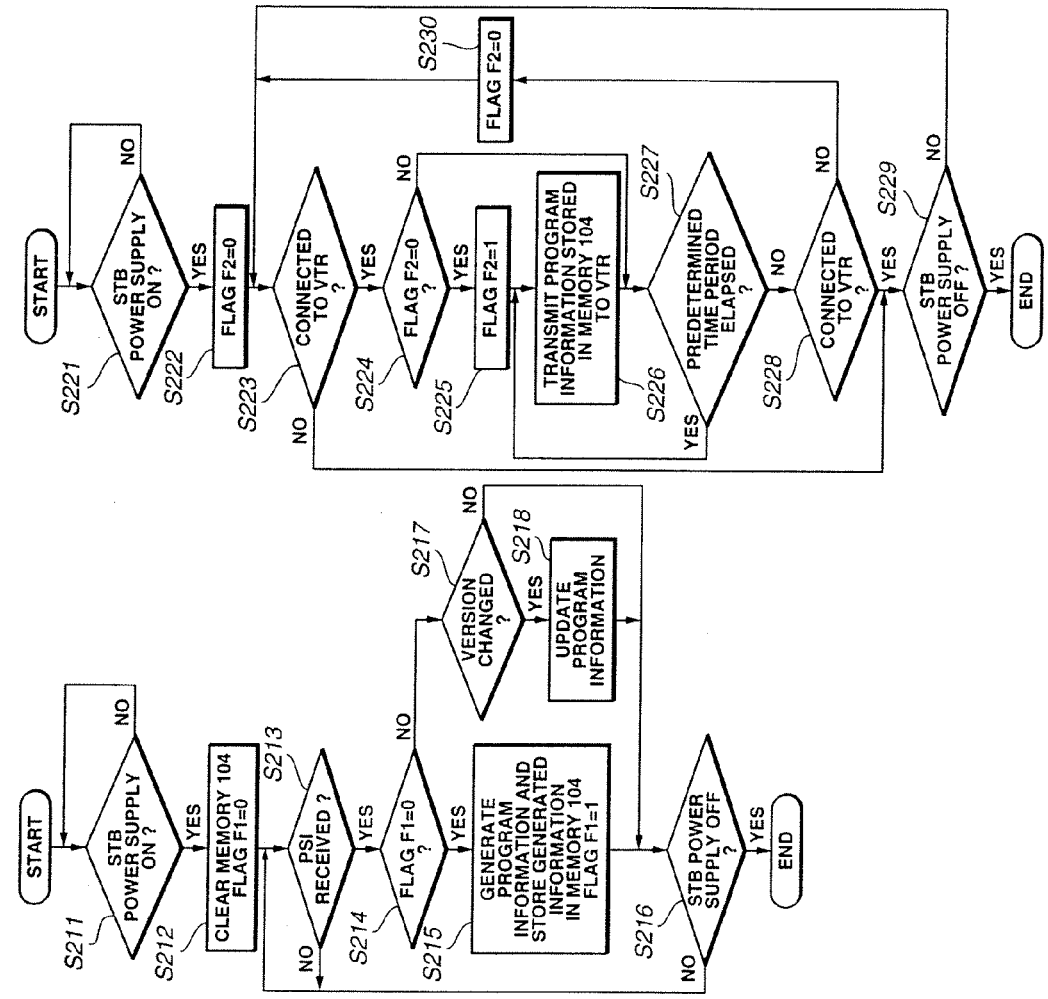
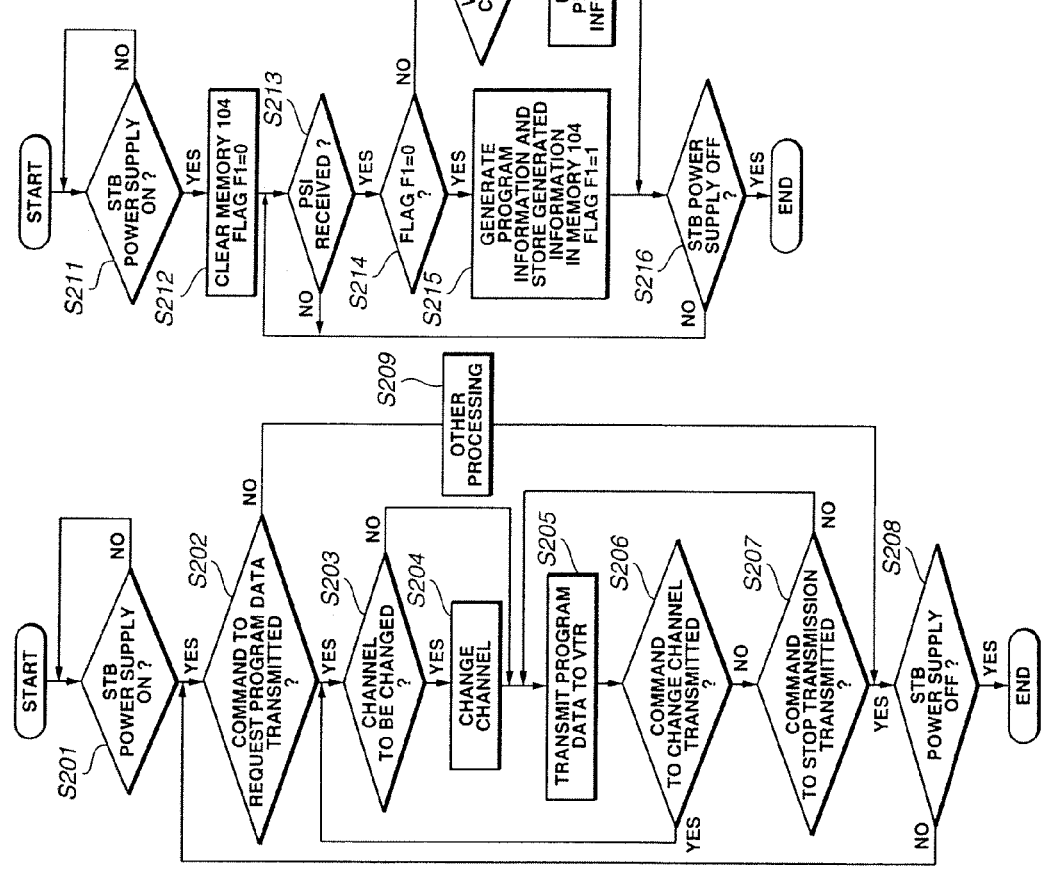

RECORDING APPARATUS AND METHOD WITH SELECTION OF FIRST TUNER OR SECOND TUNER FOR RECEIVING IMAGE DATA OF DESIGNATED CHANNEL

This application is a division of application Ser. No. 09/537,872 filed Mar. 29, 2000 now abandoned.

BACKGROUND OF THE INVENTION

1. Field of the Invention

The present invention relates to a recording apparatus, and more particularly, to recording of digital television (TV) broadcasting.

2. Description of the Related Art

Recently, digital TV broadcasting is attracting notice as a next-generation TV broadcasting method. Receiving decoders for digital TV broadcasting (hereinafter termed "STBs (set-top boxes)") have been developed, and digital TV broadcasting using communication satellites (CSs) has started in Japan as well as in many other countries.

When recording digital TV broadcasting by connecting a recording apparatus, such as a digital VTR or the like, to an STB, since conventional recording apparatuses have only analog input/output terminals, a received digital signal is recorded by first being subjected to D/A (digital-to-analog) conversion.

In digital TV broadcasting, degradation of a signal can be improved by transmitting and recording the signal in the form of a digital signal. Accordingly, connection between a recording apparatus, such as a digital VTR or the like, and an STB using a digital interface conforming to the IEEE 1394 or the like has been proposed instead of conventional analog input/output connection.

However, when recording digital TV broadcasting by connecting a recording apparatus to an STB, since each of the STB, the recording apparatus and a display device is operated through an operation unit provided therein or according to remote control, it is necessary to perform a complicated operation.

Particularly when reserving picture recording, it is necessary to perform a more complicated operation, because the picture surface of the display device is switched for operating the STB or the recording apparatus.

SUMMARY OF THE INVENTION

The present invention has been made in consideration of the above-described problems.

It is an object of the present invention to provide a recording apparatus and a receiving/recording system in which recording and reservation of picture recording of digital TV broadcasting can be performed with an easy operation.

According to one aspect of the present invention, a recording apparatus includes input means for inputting a television signal and channel information relating to the television signal from an external receiving apparatus which receives the television signal and generates the channel information, recording means for recording the television signal, and control means for controlling the recording means based on the channel information input by the input means.

According to another aspect of the present invention, a recording apparatus includes input means for inputting a television signal and channel information relating to the television signal from an external receiving apparatus which receives the television signal and generates the channel information, assignment means for assigning an arbitrary program from among programs relating to the channel information, recording means for recording the television signal, and control means for controlling the recording means so as to record the television signal relating to the program assigned by the assignment means.

According to still another aspect of the present invention, a television signal receiving apparatus includes receiving means for receiving a television signal, generation means for generating channel information relating to the television signal received by the receiving means, and interface means for outputting the television signal received by the receiving means and the channel information generated by the generation means to an external recording apparatus. The external recording apparatus records the television signal based on the output channel information.

According to yet another aspect of the present invention, a television signal receiving and recording system includes a receiving apparatus including receiving means for receiving a television signal, generation means for generating channel information relating to the television signal, and output means for outputting the television signal received by the receiving means and the channel information generated by the generation means, and a recording apparatus including input means for inputting the television signal and the channel information from the receiving apparatus, recording means for recording the television signal, and control means for controlling the recording means based on the channel information input by the input means.

The foregoing and other objects, advantages and features of the present invention will become more apparent from the following detailed description of the preferred embodiments taken in conjunction with the accompanying drawings.

BRIEF DESCRIPTION OF THE DRAWINGS

FIGS. 2A–2C are flowcharts, each illustrating an operation of a control unit 112 shown in FIG. 1;

DETAILED DESCRIPTION OF THE PREFERRED EMBODIMENTS

Preferred embodiments of the present invention will now be described in detail with reference to the drawings.

Figure 1:
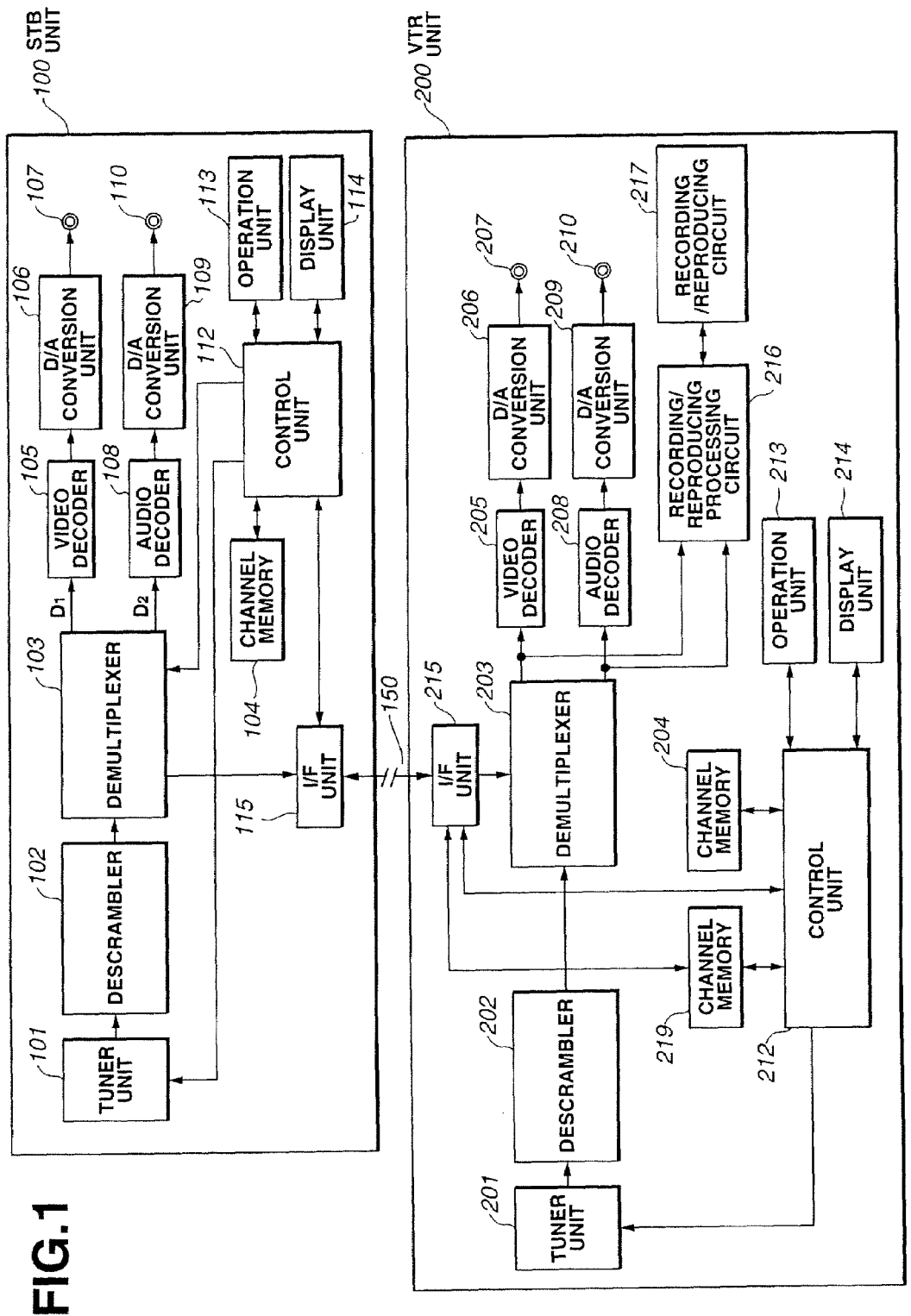
FIG. 1 is a block diagram illustrating the configurations of a receiving apparatus and a recording apparatus according to a first embodiment of the present invention.

FIG. 1 is a block diagram illustrating the configurations of a digital VCR and a receiving apparatus connected thereto in a digital TV broadcasting recording system according to a first embodiment of the present invention.

In FIG. 1, an STB unit 100 and a VTR unit 200 are connected to each other by an AV (audio visual) bus 150 conforming to the IEEE 1394.

The configuration of the STB unit 100 will now be described.

First, a description will be provided of a case in which a program is seen by displaying an image represented by a signal received by a tuner unit 101 on an external display device. In the STB unit 100, the signal supplied from an antenna or a cable (not shown) is input to the tuner unit 101.

The tuner unit 101 performs processing, such as demodulation, error correction and the like, for the received signal, generates digital data in a form called a transport stream, and outputs the generated transport stream (TS) data to a descrambler 102.

When the TS data subjected to scrambling for limiting view of the data has been input from the tuner unit 101, the descrambler 102 releases the scrambling based on key information for descrambling contained in the TS data and key information output from an IC card control unit (not shown), and outputs resultant data to a demultiplexer 103.

When TS data not subjected to scrambling has been input from the tuner unit 101, the descrambler 102 outputs the received TS data to the demultiplexer 103 without modifying the data.

The demultiplexer 103 extracts image data D1 and sound data D2 relating to the program currently being broadcasted in a channel selected by an operation through an operation unit 113 from the TS data where image data, sound data and the like for a plurality of channels input from the descrambler 102 are subjected to time division multiplexing, and outputs the image data D1 and the sound data D2 to a video decoder 105 and an audio decoder 108, respectively.

The demultiplexer 103 reads channel information relating to the channel selected by the operation through the operation unit 113 from a channel memory 104, and extracts the image data D1 and the sound data D2 from the TS data, based on the read channel information. Channel information relating to channels which can be seen, such as free channels, subscribed channels and the like, is written in the channel memory 104 in a state of corresponding to respective channel numbers. The details of the information stored in the channel memory 104 will be described later.

A video decoder 105 performs MPEG2 decoding processing for the image data D1 input from the demultiplexer 103, and outputs the decoded image data to a D/A conversion unit 106. The D/A conversion unit 106 converts the digital image data input from the video decoder 105 into an analog signal, and outputs the analog signal to an image-signal output terminal 107. The image signal input from the D/A conversion unit 106 is output from the image-signal output terminal 107 to an external display device.

An audio decoder 108 performs MPEG2 decoding processing for the sound data D2 input from the demultiplexer 103, and outputs the decoded sound data to a D/A conversion unit 109. The D/A conversion unit 109 converts the digital sound signal input from the audio decoder 108 into an analog signal, and outputs the analog signal to a sound-signal output terminal 110. The sound signal input from the D/A conversion unit 109 is output from the sound-signal output terminal 110 to an external audio apparatus.

Next, the operation of the STB unit 100 when recording a signal received by the tuner unit 101 in the VTR unit 200 will be described. Since the operation up to the descrambler 102 is the same as the above-described operation, further description thereof will be omitted.

When there is a request for transmission of program data provided from the VTR unit 200, the demultiplexer 103 extracts image data and sound data relating to the program currently being broadcasted in a channel for which the request for transmission has been provided, from the TS data input from the descrambler 102, and outputs the extracted data to an IF (interface) unit 115.

Channel information relating to the channel for which the request for transmission has been provided is input to a control unit 112 via the IF unit 115 together with a command of the request for transmission of program data. The control unit 112 controls the demultiplexer 103 so as to extract the image data and the sound data from the TS data, based on the input channel information.

The demultiplexer 103 includes a switch (not shown), which is connected so as to output the extracted image data and sound data to the IF unit 115 when there is a request for transmission of the program data from the VTR unit 200.

The IF unit 115 processes the TS data input from the demultiplexer 103 so as to convert the data into a format conforming to the IEEE 1394, and outputs the resultant data to an IF unit 215 of the VTR unit 200.

The control unit 112 includes a microprocessor, and controls the demultiplexer 103, a display unit 114, the IF unit 115, and the like in accordance with an operation through the operation unit 113 having various operation switches, for example, for selecting a channel, and turning on the power supply of the apparatus.

When the power supply of the STB unit 100 is turned on while the STB unit 100 is connected to the VTR unit 200, the STB unit 100 is connected to the VTR unit 200 while the power supply of the STB unit 100 is turned on, or channel information is updated, the control unit 112 reads channel information from the channel memory 104, and outputs the read channel information to the IF unit 215 of the VTR unit 200 via the IF unit 115. This operation is repeated at every predetermined time period. The details of this operation will be described later.

The display unit 114 displays the channel number, the current time or the like in accordance with an operation through the operation unit 113.

Next, the configuration of the VTR unit 200 will be described.

The VTR unit 200 has an internal recording mode of recording a signal received by an incorporated tuner unit 201, an external recording mode of recording a signal received by the tuner unit 101 of the STB unit 100, and an another-program recording mode of displaying a signal received by the incorporated tuner unit 201 on an external display device and recording a signal received by the tuner unit 101 of the STB unit 100.

In the VTR unit 200, a control unit 212 performs switching between the external recording mode and the internal recording mode in accordance with a channel assigned by the user. That is, as soon as a picture recording operation or a picture-recording reservation operation has been started in accordance with an operation through an operation unit 213, the control unit 212 performs switching to the internal recording mode if the channel assigned by the user is a channel which can be received by the tuner unit 201 incorporated in the VTR unit 200, and to the external recording mode if the assigned channel is a channel which can be received by the STB unit 100.

The operation unit 213 has an another-program recording mode button (not shown). The control unit 212 performs switching to the another-program recording mode in accordance with depression of the another-program recording mode button by the user. When the another-program recording mode button is depressed by the user while a channel receivable in the STB unit 100 is assigned, the control unit 212 switches the mode to the another-program recording mode. When the another-program recording mode button is depressed by the user while a channel receivable in the tuner unit 201 incorporated in the VTR unit 200 is assigned, the control unit 212 switches the mode to the internal recording mode.

First, the operation in the internal recording mode will be described. In the VTR unit 200, a signal supplied from an antenna or a cable (not shown) is input to the tuner unit 201. The tuner unit 101 and the tuner unit 201 receive signals transmitted through different types of transmission channels. For example, the tuner unit 101 receives a signal from a CS, and the tuner unit 201 receives a signal from a ground wave.

The configurations of components 201–210 in the VTR unit 200 are the same as the configurations of the components 101–110 in the STB unit 100. Hence, further description of the operations of the same components will be omitted.

A demultiplexer 203, however, has a configuration slightly different from the configuration of the above-described demultiplexer 103. The demultiplexer 203 has a switch and a buffer storage (not shown). The switch is connected so that a signal input from a descrambler 202 is output to a video decoder 205, an audio decoder 208, and a recording/reproducing processing circuit 216 during the internal recording mode.

The demultiplexer 203 extracts image data D1 and sound data D2 relating to the program currently being broadcasted in a channel assigned by an operation through an operation unit 213 from TS data input from the descrambler 202 as in the above-described manner, and outputs the extracted image data D1 and sound data D2 to the video decoder 205 and the audio decoder 208, respectively, and also to the recording/reproducing processing circuit 216.

The recording/reproducing processing circuit 216 performs processing necessary for recording, such as synchronization, addition of IDs and the like, error-correcting encoding, digital modulation and the like, for the image data D1 and the sound data D2 input from the demultiplexer 203, and outputs resultant data to a recording/reproducing circuit 217.

The recording/reproducing circuit 217 records the image data and the sound data input from the recording/reproducing processing circuit 216 on a magnetic tape.

Next, the operation in the external recording mode will be described.

First, an IF unit 215 outputs channel information written in the channel memory 104, which has been input from the IF unit 115 in the above-described manner, to a channel memory 219. The channel memory 219 stores the channel information input from the IF unit 215.

That is, the channel memory 219 stores the numbers of channels which can be seen in the STB unit 100, and channel information corresponding to the respective channel numbers. The channel memory 219 also updates the stored channel information in accordance with input of channel information repeated at every predetermined time period.

The IF unit 215 outputs the image data and the sound data input from the demultiplexer 103 via the IF unit 115 in the above-described manner to the demultiplexer 203. The demultiplexer 203 outputs the image data and the sound data input from the IF unit 215 to the video decoder 205 and the audio decoder 208, respectively, and also to the recording/reproducing processing circuit 216.

The switch within the demultiplexer 203 is connected so that the signal input from the IF unit 215 is output to the video decoder 205 and the audio decoder 208, respectively, and also to the recording/reproducing processing circuit 216, during the external recording mode.

Since the configurations of the components 205–210 in the VTR unit 200 are the same as the configurations of the components 105–110 in the STB unit 100, further description thereof will be omitted. The recording/reproducing processing circuit 216 and the recording/reproducing circuit 217 operate in the above-described manner.

Next, the operation in the another-program recording mode will be described.

The control unit 212 switches the mode to the another-program recording mode by the depression of the another-program recording mode switch as described above, and sets a recording channel in order to record the assigned channel receivable in the STB unit 100. The control unit 212 also controls a display unit 214 so that a desired channel can be selected from among channels receivable in the tuner unit 201 incorporated in the VTR unit 200. The display unit 214 fixedly displays the channel of the STB unit 100 set as the recording channel, and selectively displays a channel receivable in the tuner unit 201 incorporated in the VTR unit 200.

The signal received by the tuner unit 201 is input to the demultiplexer 203 via the descrambler 202 in the above-described manner. The signal received by the tuner unit 101 is also input to the demultiplexer 203 via the IF unit 215 in the above-described manner.

The demultiplexer 203 includes buffer memories capable of storing respective predetermined amounts of TS data from the descrambler 202 and TS data from the IF unit 215. By reading data stored in the respective buffer memories while performing switching between these memories at every predetermined time period, the input data from the descrambler 202 and the input data from the IF unit 215 are output to the video decoder 205, the audio decoder 208 and the recording/reproducing processing circuit 216.

Since the configurations of the components 205–210 in the VTR unit 200 are the same as the configurations of the components 105–110 in the STB unit 100, further description thereof will be omitted. The recording/reproducing processing circuit 216 and the recording/reproducing circuit 217 operate in the above-described manner.

The image data and the sound data recorded in the above-described manner are reproduced by the recording/reproducing circuit 217 in accordance with an operation through the operation unit 213, and are output to the recording/reproducing processing circuit 216. The recording/reproducing processing circuit 216 performs processing, such as demodulation, error correction and the like, for the image data and the sound data input from the recording/reproducing circuit 217, and outputs resultant image data and sound data to the video decoder 205 and the audio decoder 208, respectively.

Since the configurations of the components 205–210 in the VTR unit 200 are the same as the configurations of the components 105–110 in the STB unit 100, further description thereof will be omitted.

The control unit 212 includes a microprocessor, and controls the demultiplexer 203, the display unit 214, the IF unit 215, the recording/reproducing circuit 217 and the like in accordance with an operation through the operation unit 213 having various operation switches for recording, reproduction, stop, mode setting, channel setting and the like. The details of the operation of the control unit 212 will be described later.

The display unit 214 displays a channel number, the current time, a set mode, the operational state or the like in accordance with an operation through the operation unit 213.

A description will now be provided of channel information to be written in the channel memories 104 and 219.

In digital TV broadcasting, in order to receive a channel selected by the user, it is necessary to obtain PSI (program specific information) data mostly called a PAT (program association table), a PMT (program map table), or an NIT (network information table).

TS data including such PSI data, sound data and image data called elementary data, EPG (electronic programming guide) data and the like is transmitted in units of a packet. PID (packet information) is added to the head of the packet.

The PID of a packet of image data and sound data constituting a program is described in a PMT, and the PID of the PMT is described in a PAT. The PID of the PMT described in the PAT is provided so as to correspond to the number of each channel contained in each TS. Physical information relating to the transmission channel in each TS, such as the orbit of the satellite, polarization, the transmission frequency for each TS, and the like, is described in an NIT. Information for recognizing a channel contained in each TS is also described in the NIT.

In the STB unit 100, the control unit 112 extracts the number of the channel contained in the currently received TS and the transmission frequency of the TS from the NIT contained in the TS received by the tuner unit 101.

The control unit 112 also extracts the number of the channel contained in the currently received TS and the PID of the PMT corresponding to the channel number from the PAT contained in the TS received by the tuner unit 101.

The transmission frequency and the PID of the PMT of each TS extracted in the above-described manner are stored in the channel memory 104 so as to correspond to each channel number. That is, the control unit 112 writes minimum data necessary for receiving the channel selected by the user into the channel memory 104 as channel information.

In the VTR unit 200, also, the control unit 212 performs the operation in the above-described manner. The control unit 212 writes the transmission frequency and the PID of the PMT of each TS which have been extracted into the channel memory 204 in a state of corresponding to each channel number.

Next, the detailed operation of the control unit 112 in the STB unit 100 will be described.

FIGS. 2A–2C are flowcharts, each illustrating an operation of the control unit 112: FIG. 2A illustrates the operation which is usually performed in the STB unit 100; FIG. 2B illustrates the operation when updating channel information; and FIG. 2C illustrates the operation during transmission of channel information to the VTR unit 200. The control unit 112 controls the respective units so that these operations are performed in parallel in accordance with a program stored in an incorporated memory.

The operation in FIG. 2A will now be described. In step S201, it is determined if the power supply of the STB unit 100 has been turned on. If the result of the determination in step S201 is affirmative, the process proceeds to step S202. If the result of the determination in step S201 is negative, turning-on of the power supply is awaited in step S201.

In step S202, it is determined if a command to request program data has been transmitted from the VTR unit 200. If the result of the determination in step S202 is affirmative, the process proceeds to step S203. If the result of the determination in step S202 is negative, processing based on an ordinary operation, such as channel switching or the like, is performed (step S209), and the process then proceeds to step S208.

In step S203, it is determined if it is necessary to change channel setting. If the result of the determination in step S203 is affirmative, i.e., if it has been determined that the channel requested by the command to request program data differs from the currently set channel, the currently set channel is changed to the channel requested by the command (step S204), and the process then proceeds to step S205.

In step S205, image data and sound data of the program currently being broadcasted in the channel for which transmission is requested are extracted from the TS data received by the tuner unit 101, and the extracted data is transmitted to the VTR unit 200. In step S206, it is determined if a command to change the channel has been transmitted from the VTR unit 200. If the result of the determination in step S206 is affirmative, the process returns to step S203, where a procedure to change the channel is executed. If the result of the determination in step S206 is negative, the process proceeds to step S207.

In step S207, it is determined if a command to stop the transmission of program data has been transmitted from the VTR unit 200. If the result of the determination in step S207 is negative, the process returns to step S205, where image data and sound data are transmitted to the VTR unit 200. If the result of the determination in step S207 is affirmative, the process proceeds to step S208.

In step S208, it is determined if the power supply of the STB unit 100 has been turned off. If the result of the determination in step S208 is affirmative, the series of processing is terminated. If the result of the determination in step S208 is negative, the process returns to step S202, and the above-described operation is repeated.

The operation in FIG. 2B will now be described. In step S211, it is determined if the power supply of the STB unit 100 has been turned on. If the result of the determination in step S211 is affirmative, the channel memory 104 is cleared and a flag indicating the state of the channel memory 104 is set to F1=0 (step S212), and the process then proceeds to step S213. The case of F1=0 indicates a state in which nothing is stored in the channel memory 104, and the case of F1=1 indicates a state in which information is stored in the channel memory 104. If the result of the determination in step S211 is negative, turning-on of the power supply is awaited in step S211.

In step S213, it is determined if PSI data has been received. If the result of the determination in step S213 is affirmative, the process proceeds to step S214. If the result of the determination in step S213 is negative, the reception of PSI data is awaited in step S213. In step S214, it is determined if the flag F1=0. If the result of the determination in step S214 is affirmative, the transmission frequency and the PID of the PMT is extracted from the received PSI data, and channel information is formed. The formed channel information is written into the channel memory 104, and the flag is set to F1=1 (step S215). The process then proceeds to step S216.

If the result of the determination in step S214 is negative, the process proceeds to step S217. In step S217, it is determined if the PSI data received in step S213 is updated. That is, it is determined if the version number described in the PSI data received in step S213 differs from the version number of the PSI data from which the currently stored channel information has been extracted.

If the result of the determination in step S217 is affirmative, channel information is newly formed from the received PSI data, the formed channel information is overwritten in the channel memory 104 (step S218), and the process then proceeds to step S216. If the result of the determination in step S217 is negative, the process proceeds to step S216.

In step S216, it is determined if the power supply of the STB unit 100 has been turned on. If the result of the determination in step S216 is affirmative, the series of operations is terminated. If the result of the determination in step S216 is negative, the process returns to step S213, and the above-described operation is repeated.

The operation in FIG. 2C will now be described. In step S221, it is determined if the power supply of the STB unit 100 has been turned on. If the result of the determination in step S221 is affirmative, a flag indicating the state of the IF unit 115 is set to F2=0 (step S222), and the process proceeds to step S223. The case of F2=0 indicates a state in which the IF unit 115 is not connected to the VTR unit 200, and the case of F2=1 indicates a state in which the IF unit 115 is connected to the VTR unit 200.

If the result of the determination in step S221 is negative, turning-on of the power supply is awaited in step S221.

In step S223, it is determined if the STB unit 100 is connected to the VTR unit 200. If the result of the determination in step S223 is affirmative, the process proceeds to step S224. If the result of the determination in step S223 is negative, the process proceeds to step S229. In step S224, it is determined if the flag of the IF unit 115 indicates that F2=0. If the result of the determination in step S224 is affirmative, the flag is set to F2=1 (step S225), the channel information stored in the channel memory 104 is transmitted to the VTR unit 200 (step S226), and the process then proceeds to step S227. If the result of the determination in step S224 is negative, the process proceeds to step S227.

In step S227, it is determined if a predetermined time period has elapsed after the channel information has been transmitted to the VTR unit 200 in step S226. If the result of the determination in step S227 is negative, the process proceeds to step S228. If the result of the determination in step S227 is affirmative, the process returns to step S226, where the channel information is again transmitted to the VTR unit 200.

In step S228, it is determined if the STB unit 100 is connected to the VTR unit 200. If the result of the determination in step S228 is affirmative, the process proceeds to step S229. If the result of the determination in step S228 is negative, the flag of the IF unit 115 is set to F2=0 (step S230), and the process then returns to step S223. In step S229, it is determined if the power supply of the STB unit 100 has been turned off. If the result of the determination in step S229 is affirmative, the series of operations is terminated. If the result of the determination in step S229 is negative, the process returns to step S223, and the above-described processing is repeated.

According to the above-described flow of operation, it is possible to transmit channel information to the VTR unit 200 in accordance with turning-on of the power supply of the STB unit 100 and start of the connection of the VTR unit 200 while the power supply of the STB unit 100 is turned on.

The detailed operation of the control unit 212 in the VTR unit 200 will now be described. In step S301, it is determined if the power supply of the VTR unit 200 has been turned on. If the result of the determination in step S301 is affirmative, the process proceeds to step S302. If the result of the determination in step S301 is negative, turning-on of the power supply is awaited in step S301.

In step S302, it is determined if the STB unit 100 is connected. If the result of the determination in step S302 is affirmative, the process proceeds to step S303. If the result of the determination in step S302 is negative, the channel memory 219 is cleared (step S309), a flag indicating the state of the channel memory 219 is set to F3=0 (step S310), and the process then proceeds to step S305. The case of F3=0 indicates a state in which nothing is stored in the channel memory 219, and the case of F3=1 indicates a state in which information is stored in the channel memory 219.

In step S303, it is determined if channel information has been transmitted from the STB unit 100 within a predetermined time period. If the result of the determination in step S303 is affirmative, the channel information transmitted from the STB unit 100 is stored into the channel memory 219, the flag is set to F3=1 (step S304), and the process then proceeds to step S305. If the result of the determination in step S303 is negative, the channel memory 219 is cleared in step S309, and the flag is set to F3=0 in step S310.

In step S305, it is determined if the current mode is the picture-recording reservation mode. It the result of the determination in step S305 is negative, ordinary processing other than reservation of picture recording, such as recording, reproduction, channel switching or the like, is performed (step S306), and the process then proceeds to step S307. If the result of the determination in step S305 is affirmative, the process proceeds to step S311, where processing in the picture-recording reservation mode (to be described later) is performed, and the series of operations is terminated.

In step S307, it is determined if the power supply of the VTR unit 200 has been turned off. If the result of the determination in step S307 is affirmative, the series of operations is terminated. If the result of the determination in step S307 is negative, the process returns to step S302, and the above-described processing is repeated.

Figure 3:
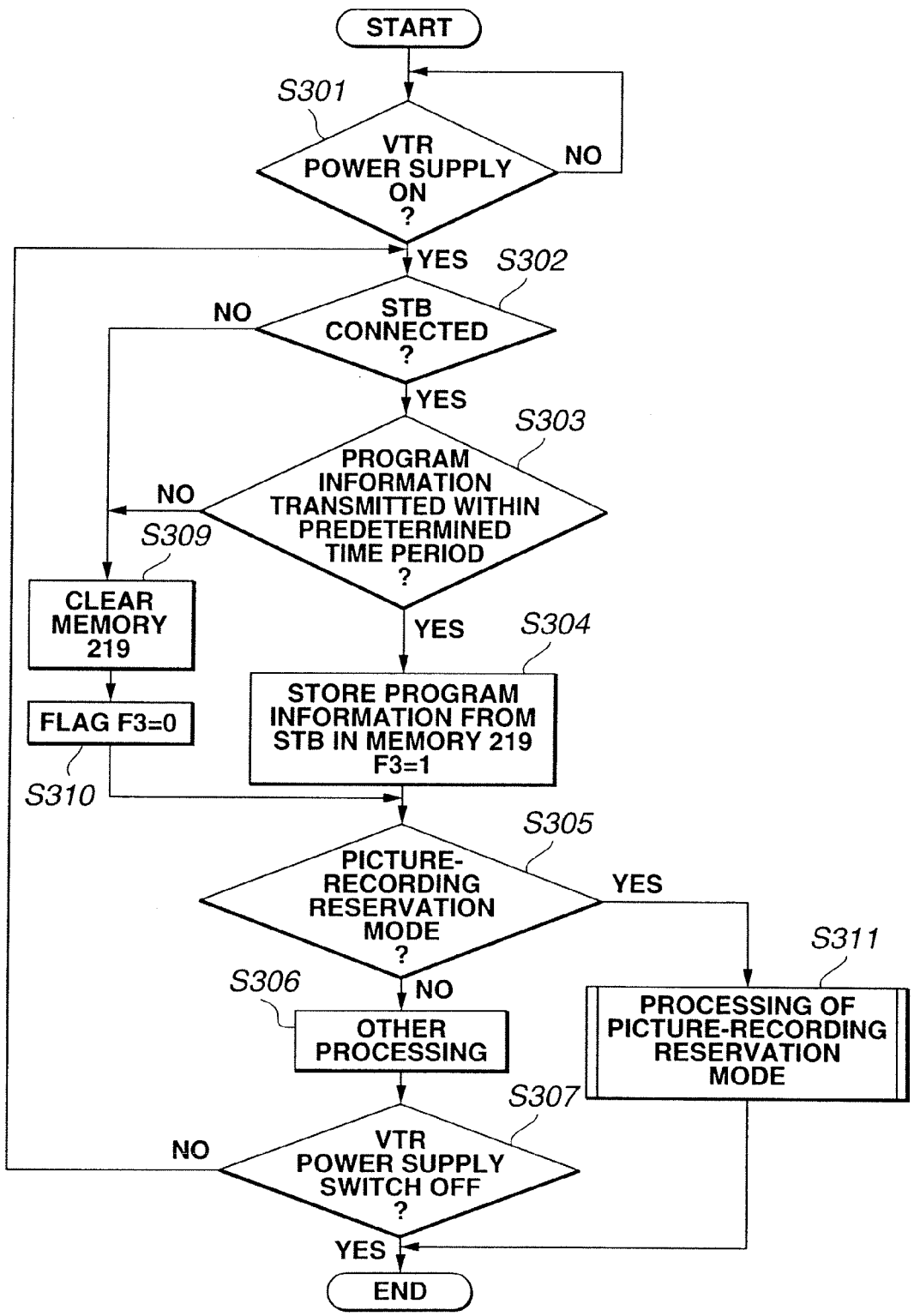
FIGS. 3 and 4 are flowcharts, each illustrating an operation of a control unit 212 shown in FIG. 1.
Figure 4:
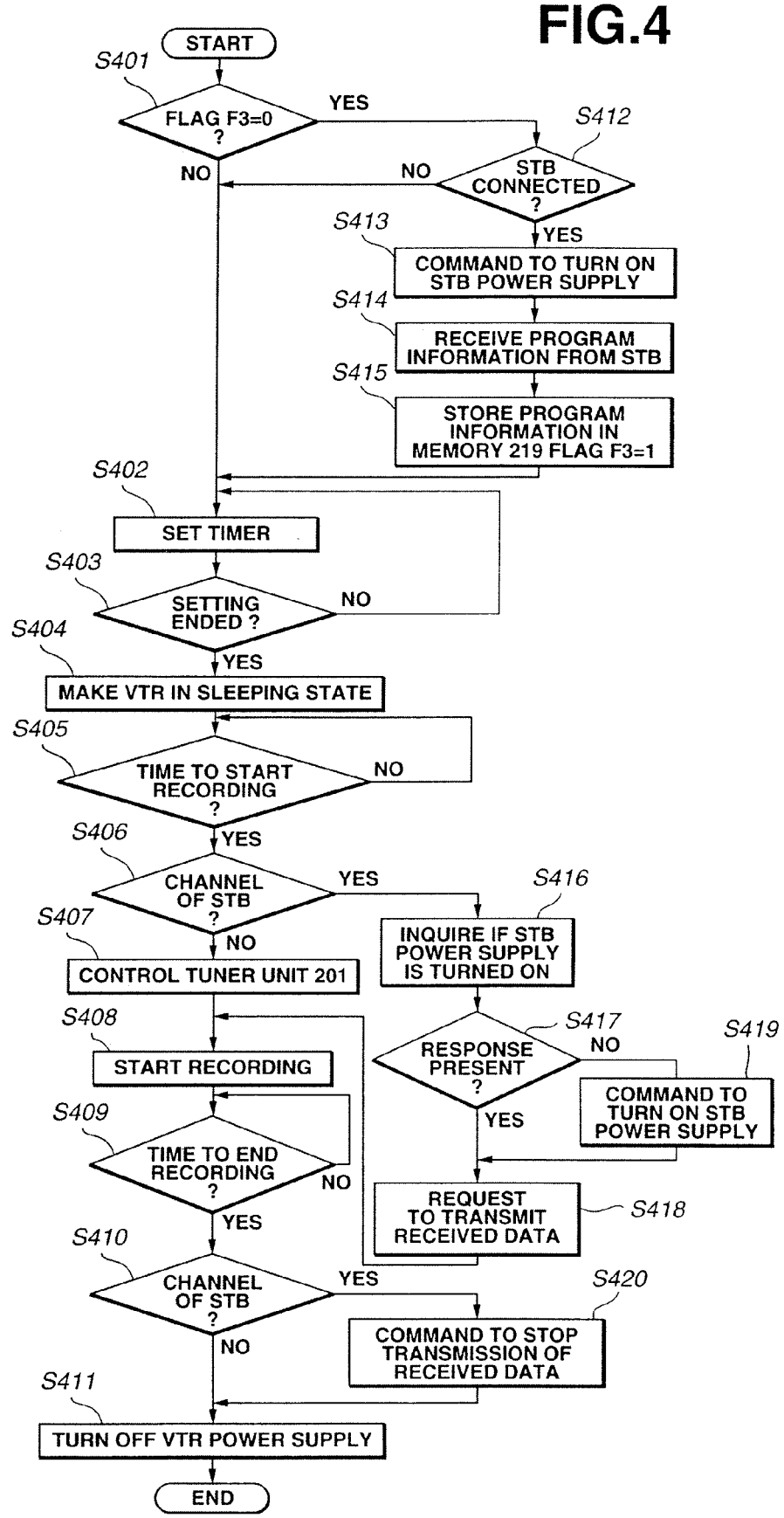

FIG. 4 is a flowchart illustrating the operation of the control unit 212 performed when the picture-recording reservation mode has been set. The operation until the picture-recording reservation mode is set after the power supply of the VTR unit 200 has been turned on is as shown in steps S301–S305, S309 and S310. The operation shown in FIG. 4 is an operation starting from step S311 shown in FIG. 3.

In step S401, it is determined if the flag indicating the state of the channel memory 219 is F3=0. If the result of the determination in step S401 is affirmative, the process proceeds to step S412. If the result of the determination in step S401 is negative, the process proceeds to step S402.

In step S412, it is determined if the STB unit 100 is connected. If the result of the determination in step S412 is negative, the process proceeds to step S402. If the result of the determination in step S412 is affirmative, the power supply of the STB unit 100 is turned on (step S413), and channel information stored in the channel memory 104 of the STB unit 100 is received (step S414). The received channel information is stored into the channel memory 219 and the flag is set to F3=1 (step S415), and the process then proceeds to step S402.

In step S402, the time to start and the time to end broadcasting, the channel and the like of a desired program are set, and the process then proceeds to step S403. At that time, if channel information of the STB unit 100 is stored in the channel memory 219, it is also possible to reserve a program of a channel which can be received by the STB unit 100, using the channel information.

In step S403, it is determined if setting has been completed. If the result of the determination in step S403 is affirmative, the VTR unit 200 is made in a sleeping state (step S404), and the process then proceeds to step S405. In step S405, it is determined if the time to start recording of the program for which recording has been reserved has come. If the result of the determination in step S405 is affirmative, the process proceeds to step S406. If the result of the determination in step S405 is negative, the process returns to step S405, where it is awaited until the time to start recording comes.

In step S406, it is determined if the program for which picture recording has been reserved is a program of a channel receivable by the STB unit 100. If the result of the determination in step S406 is affirmative, the process proceeds to step S416. If the result of the determination in step S406 is negative, tuning is performed to the channel of the program for which picture recording has been reserved, by controlling the tuner unit 201 incorporated within the VTR unit 200.

In step S416, a signal inquiring if the power supply of the STB unit 100 is turned on is transmitted to the STB unit 100, and it is determined if a response from the STB unit 100 is present (step S417). If the result of the determination in step S417 is affirmative, the process proceeds to step S418. If the result of the determination in step S417 is negative, a command to turn on the power supply of the STB unit 100 is transmitted to the STB unit 100 (step S419), and the process then proceeds to step S418. In step S418, a command to request program data is transmitted to the STB unit 100 in order to receive image data and sound data of the program for which picture recording has been reserved from the STB unit 100, and the process then proceeds to step S408.

In step S408, recording of image data and sound data of the program for which picture recording has been reserved is started, and the process proceeds to step S409. In step S409, it is determined if the time to end recording has come. If the result of the determination in step S409 is affirmative, the process proceeds to step S410. If the result of the determination in step S409 is negative, it is awaited until the time to end recording comes in step S409.

In step S410, it is determined if the channel of the recorded program is a channel in the STB unit 100. If the result of the determination in step S410 is affirmative, a command to stop the transmission of program data is transmitted to the STB unit 100 (step S420), and the process then proceeds to step S411. If the result of the determination in step S410 is negative, the process directly proceeds to step S411. In step S411, the power supply of the VTR unit 200 is turned off, and the series of operations is terminated.

As described above, in the first embodiment, since information relating to channels receivable by the STB unit 100 is stored in the VTR unit 200, it is possible to select a channel in the STB unit 100 only by an operation of the VTR unit 200. Accordingly, recording and reservation of picture recording of digital TV broadcasting can be performed with an easy operation.

Furthermore, since information relating to channels receivable by the STB unit 100 is transmitted not only to the VTR unit 200 at every predetermined time period, but also in accordance with turning-on of the power supply of the STB unit 100 or connection of the VTR unit 200 while the power supply of the STB unit 100 is turned on, the user need not perform an operation of acquiring the information, and recording and reservation of picture recording of digital TV broadcasting can be performed with an easier operation.

Although in the first embodiment, the transmission frequency and the PID of the PMT of a channel receivable by the STB unit 100 are extracted from PSI data received by the STB unit 100 and the extracted data is stored in the VTR unit 200, EPG data received by the STB unit 100 may be stored in the VTR unit 200. An EPG relating to the EPG data may be displayed on an external display device, and a channel in the STB unit 100 may be selected, for example, according to assignment by a selection cursor by an operation through the operation unit of the VTR unit 200.

In the first embodiment, when recording a program received by the STB unit 100 in the VTR unit 200, channel information stored in the VTR unit 200 is transmitted to the STB unit 100, and desired program data is extracted in the STB unit 100 based on the channel information. However, received TS data may be transmitted from the STB unit 100 to the VTR unit 200 without being modified, and the VTR unit 200 may extract desired program data based on the channel information stored in the VTR unit 200.

Although in the first embodiment, data in a format conforming to the IEEE 1394 is transmitted between the STB unit 100 and the VTR unit 200, the data may be transmitted using any other appropriate digital interface.

Figure 5:
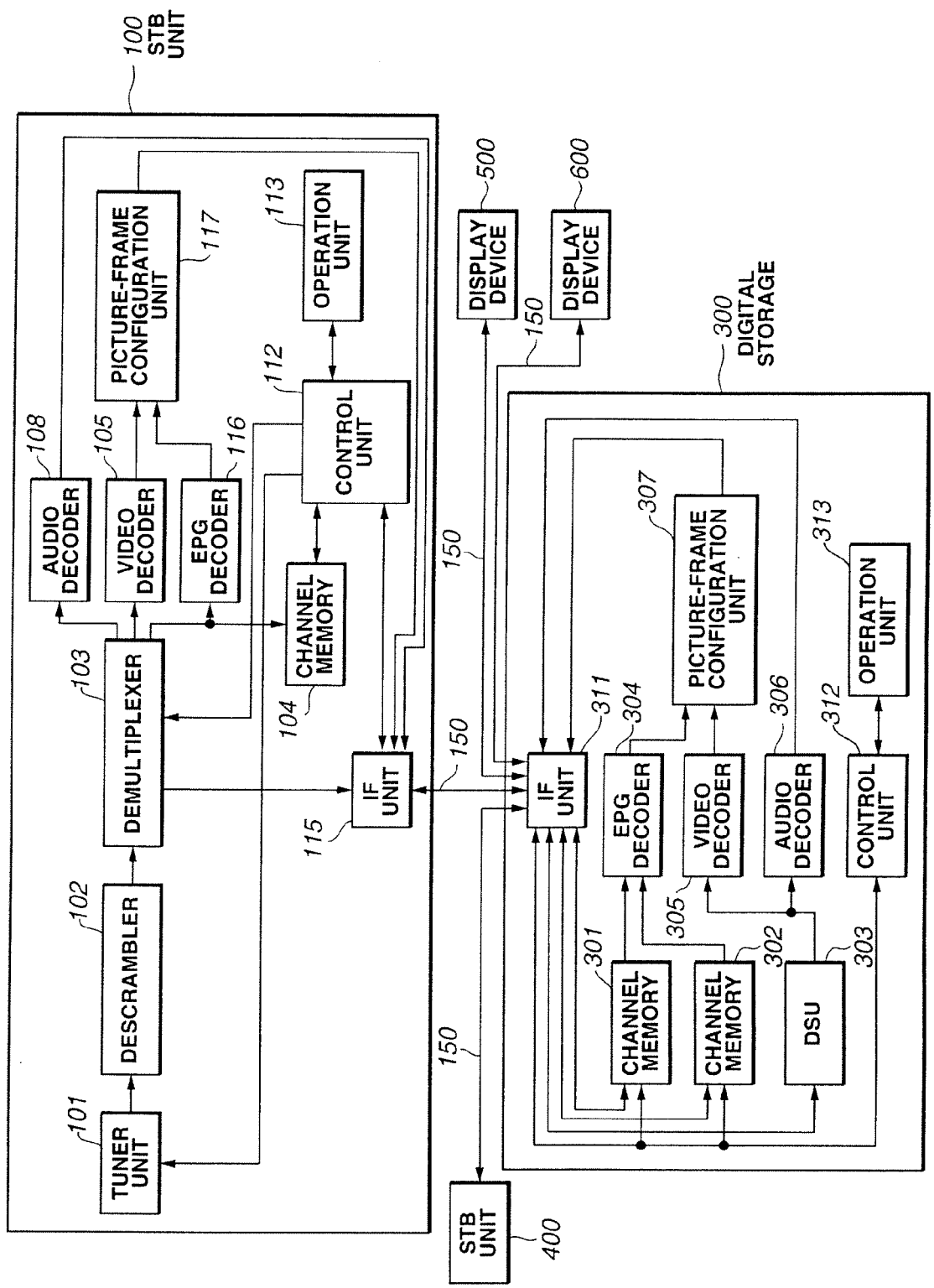
FIG. 5 is a diagram illustrating the configuration of a receiving apparatus and a digital storage according to a second embodiment of the present invention.

FIG. 5 illustrates the configurations of a digital storage and a receiving apparatus connected thereto, in a digital TV broadcasting recording system according to a second embodiment of the present invention.

In FIG. 5, a digital storage 300, STB units 100 and 400, and display devices 500 and 600 are interconnected via an AV bus 150 conforming to the IEEE 1394. The same components as those in the first embodiment shown in FIG. 1 are indicated by the same reference numerals, and further description thereof will be omitted.

The configuration of the second embodiment differs from the configuration of the first embodiment in that program data of digital TV broadcasting is stored in the digital storage 300 via IF units 115 and 311, and that the STB unit 100 also includes an EPG decoder 116 and a picture-frame configuration unit 117, and a program can be selected using an EPG picture frame configured based on EPG data in the TS.

First, a description will be provided of a case in which in the STB unit 100, a program is seen by displaying a signal received by a tuner unit 101 on the display device 500 or 600. Since the configurations and operations other than those of a channel memory 104, the EPG decoder 116 and the picture-frame configuration unit 117 are the same as those in the first embodiment, further description thereof will be omitted, and a description will be provided of the operation of displaying the EPG picture frame.

When an instruction to display the EPG picture frame is provided by an operation through an operation unit 113, a control unit 112 reads EPG data from the channel memory 104, and outputs the read data to the EPG decoder 116. The read EPG data is EPG data in a channel selected in accordance with an operation through the operation unit 113.

The channel memory 104 stores EPG data which has been extracted from TS data by a demultiplexer 103 and has been input. The channel memory 104 also updates EPG data in accordance with turning-on of the power supply of the STB unit 100 or a change in the version of EPG data, as in the first embodiment.

The EPG decoder 116 decodes the EPG data input from the demultiplexer 103, and outputs resultant data to the picture-frame configuration unit 117. The picture-frame configuration unit 117 outputs a character signal for configuring an EPG picture frame based on the input EPG data, to the IF unit 115.

The IF unit 115 outputs the above-described character signal to an arbitrary external connected apparatus, for example, the display device 500, via the AV bus conforming to the IEEE 1394. The display device 500 displays the EPG picture frame based on the input character signal.

Next, a description will be provided of the operations of the STB unit 100 and the digital storage 300 when storing a signal received by the STB unit 100 into the digital storage 300. Since the operation of the STB unit 100 is the same as the operation in the first embodiment, further description thereof will be omitted.

In the digital storage 300, when an instruction to display an EPG picture frame is provided by an operation through an operation unit 313, a control unit 312 reads EPG data from a channel memory 301, and outputs the read data to an EPG decoder 304.

The digital storage 300 is connected to the STB units 100 and 400, and inputs EPG data received by the respective STB units, via an IF unit 311, and stores the input data in the channel memory 301 and a channel memory 302, respectively. The timing of input of the EPG data is the same as in the first embodiment, and data is always updated with latest EPG data.

The EPG decoder 304 decodes the EPG data input from the channel memory 301, and outputs resultant data to a picture-frame configuration unit 307. The picture-frame configuration unit 307 outputs a character signal for configuring an EPG picture frame based on the input EPG data, to the IF unit 311. The IF unit 311 outputs the input character signal to an arbitrary external connected apparatus, for example, the display device 600, via the AV bus 150 conforming to the IEEE 1394. The display device 500 displays the EPG picture frame based on the input character signal.

Information relating to a program selected by an operation through an operation unit (not shown) of the display device 500 is input via the IF unit 311. The control unit 312 extracts channel information relating to the program selected from the EPG data stored in the channel memory 301, based on information relating to the input selected program. As described above, the channel information includes the transmission frequency and the PID of the PMT of each TS.

The control unit 312 outputs the extracted channel information relating to the selected program to the STB unit 100 via the IF unit 311. The operation in the STB unit 100 is the same as in the first embodiment, such that sound data and image data of the selected program are input to the digital storage 300 via the IF unit 311.

In the digital storage 300, a DSU (digital storage unit) 303 stores the sound data and the image data of the selected program input via the IF unit 311.

In an operation of reproducing the sound data and the image data stored in the DSU 303, the control unit 312 outputs data selected in accordance with an operation through the operation unit 313 to a video decoder 305 and an audio decoder 306. Each of the decoders 305 and 306 decodes the input data.

The video decoder 305 outputs decoded image data to the picture-frame configuration unit 307, which outputs a character signal relating to the image data provided based on the input image data to the IF unit 311. The audio decoder 306 outputs input sound data to the IF unit 311.

The IF unit 311 outputs the character signal relating to the image data and the sound data which have been input, to an arbitrary external connected apparatus, for example, the display device 500, and to an audio apparatus (not shown), respectively, via the AV bus 150 conforming to the IEEE 1394.

As described above, in the second embodiment, since EPG data received by the STB unit 100 is stored in the digital storage 300, it is possible to select a channel in the STB unit 100 only by an operation of the digital storage 300 or an operation of an external apparatus connected to the digital storage 300. Accordingly, recording and reservation of picture recording can be performed by an easy operation.

Furthermore, since EPG data received by the STB unit 100 is transmitted not only to the digital storage 300 at every predetermined time period, but also in accordance with turning-on of the power supply of the STB unit 100 or connection of the digital storage 300 while the power supply of the STB unit 100 is turned on, the user need not perform an operation of acquiring EPG data, and it is possible to perform recording and reservation of picture recording of digital TV broadcasting with an easy operation.

In the second embodiment, when storing program data relating to a program received by the STB unit 100 in the digital storage 300, the STB unit 300 extracts desired program data based on channel information input from the digital storage 300. However, received TS data may be transmitted from the STB unit 100 to the digital storage 300 without being modified, and desired program data may be extracted in the digital storage 300 based on EPG data stored in the digital storage 300. In this case, the digital storage unit 300 includes a demultiplexer.

Although in the second embodiment, data in a format conforming to the IEEE 1394 is transmitted between the STB unit 100 and the digital storage 300, the data may be transmitted using any other appropriate digital interface.

Although in the second embodiment, the digital storage 300 includes respective decoders, such as the audio decoder 306 and the like, respective data, such as sound data and the like, may be output to an external connected apparatus including decoders, instead of providing the respective decoders in the digital storage 300.

As described above, according to the present invention, since channel information relating to channels receivable in a receiving apparatus is output to a recording apparatus, a channel in the receiving apparatus can be selected by an operation of the recording apparatus.

Accordingly, it is possible to record a television signal received by an external receiving apparatus with an easy operation.

The individual components designated by blocks in the drawings are all well known in the recording apparatus, receiving apparatus and receiving/recording system arts and their specific construction and operation are not critical to the operation or the best mode for carrying out the invention.

While the present invention has been described with respect to what are presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A recording apparatus comprising:
   a first tuner capable of receiving a first plurality of channels;
   a first memory for (a) acquiring information of a second plurality of channels from an external receiver device having a second tuner capable of receiving a second plurality of channels, wherein the information is extracted from a signal by the external receiver, stored in a memory of the external receiver having been extracted, and sent from the memory of the external receiver to said recording apparatus, and (b) storing the information;

a second memory for storing information of the first plurality of channels that is receivable by the first tuner;

an accepting unit for accepting a signal for designating a channel of either one of the first plurality of channels or the second plurality of channels; and a control unit for determining, based on information stored in each of the first memory and the second memory, a selection of either the first tuner or the second tuner, for receiving image data of the channel designated by the signal, wherein the control unit acquires the information of the second plurality of channels to be stored in the first memory at a predetermined timing and updates the first memory with the acquired information.

2. A recording apparatus comprising:

a first tuner capable of receiving a first plurality of channels;

a first memory for (a) acquiring information of a second plurality of channels from an external receiver device having a second tuner capable of receiving a second plurality of channels and (b) storing the information;

a second memory for storing information of the first plurality of channels that is receivable by the first tuner;

an accepting unit for accepting a signal for designating a channel of either one of the first plurality of channels or the second plurality of channels; and a control unit for determining, based on information stored in each of the first memory and the second memory, a selection of either the first tuner or the second tuner, for receiving image data of the channel designated by the signal, wherein the control unit acquires the information of the second plurality of channels to be stored in the first memory at a predetermined timing and updates the first memory with the acquired information, and wherein the control unit determines whether a connection between the recording apparatus and the external receiver device is connected or not, and the control unit clears the information stored in the first memory when it determines that the connection to the external receiver device is not connected.

3. A recording apparatus according to claim 2, wherein the control unit sets flag information indicating that the first memory is cleared when it clears the first memory.

4. A recording apparatus according to claim 3, further comprising a setting unit for receiving a setting of a picture-recording reservation mode for reserving recording of a program, wherein the control unit sends a command to turn on a power supply of the external receiver device when the picture-recording reservation mode is set and the flag information indicates that the first memory is cleared.

5. A method of controlling a recording apparatus having a first tuner capable of receiving a first plurality of channels, said method comprising:

a first storing step for (a) acquiring information of a second plurality of channels from an external receiver device having a second tuner capable of receiving the second plurality of channels, wherein the information is extracted from a signal by the external receiver device, stored in a memory of the external receiver device having been extracted, and sent from the memory of the external receiver device to said recording apparatus and (b) storing the information in a first memory;

a second storing step for storing information of the first plurality of channels receivable by the first tuner in a second memory;

an accepting step for accepting a signal for designating a channel of either one of the first plurality of channels or the second plurality of channels; and a controlling step for determining, based on information stored in each of the first memory and the second memory, a selection of either the first tuner or the second tuner, for receiving image data of the channel designated by the signal, wherein, in the controlling step, the information of the second plurality of channels to be stored in the first memory is acquired at a predetermined timing and the first memory is updated with the acquired information.

6. A method of controlling a recording apparatus having a first tuner capable of receiving a first plurality of channels, said method comprising:

a first storing step for (a) acquiring information of a second plurality of channels from an external receiver device having a second tuner capable of receiving the second plurality of channels, and (b) storing the information in a first memory;

a second storing step for storing information of the first plurality of channels receivable by the first tuner in a second memory;

an accepting step for accepting a signal for designating a channel of either one of the first plurality of channels or the second plurality of channels; and a controlling step for determining, based on information stored in each of the first memory and the second memory, a selection of either the first tuner or the second tuner, for receiving image data of the channel designated by the signal, wherein, in the controlling step, the information of the second plurality of channels to be stored in the first memory is acquired at a predetermined timing and the first memory is updated with the acquired information, and wherein it is determined, in the controlling step, whether the external receiver device is connected to the recording apparatus or not, and the information stored in the first memory is cleared when it is determined that the external receiver device is not connected.

7. A method according to claim 6, wherein flag information indicating that the first memory is cleared is set when the first memory is cleared in the controlling step.

8. A method according to claim 7, further comprising a setting step in which the recording apparatus receives a setting of a picture-recording reservation mode for reserving recording of a program, wherein a command to turn on a power supply of the external receiver device is sent when the picture-recording reservation mode is set and the flag information indicates that the first memory is cleared in the controlling step.

* * * * *